United States Patent [19]
Mueller

[11] Patent Number: 4,945,763
[45] Date of Patent: Aug. 7, 1990

[54] ROTOR INBALANCE CORRECTION APPARATUS AND METHOD THEREOF

[75] Inventor: Richard Mueller, Lynchburg, Va.

[73] Assignee: American Hofmann Corporation, Lynchburg, Va.

[21] Appl. No.: 356,309

[22] Filed: May 24, 1989

[51] Int. Cl.$^5$ ............................................ G01M 1/16
[52] U.S. Cl. ............................................................ 73/462
[58] Field of Search ................ 73/460, 461, 462, 463, 73/464, 465, 466, 467, 468, 469, 470, 471, 472, 473, 474, 475, 476, 477, 478, 479; 364/463

[56] References Cited

U.S. PATENT DOCUMENTS 3,228,251  1/1966  Trimble ................................. 73/462

Primary Examiner—Jerry W. Myracle
Attorney, Agent, or Firm—Cushman, Darby & Cushman

[57] ABSTRACT

An inbalance detecting and correcting station for a disk-shaped rotor. The system rotates a rotor up to speed at a measuring station, and detects reflections from the rotor. A peak among the reflections is detected in steady state, and 80% of this peak is taken as a trigger level. The peak is then used to provide a phase reference whenever the reflection exceeds the trigger level. Inbalance data is determined based on the phase 0 detected at this peak. An inbalance correction station corrects for this inbalance, using the same trigger level detected in the inbalance measuring station. This trigger level is coupled from the inbalance detecting station to the inbalance correction station, and a photosensor detects reflections from the same rotor. These reflections from the same rotor are used with the same trigger level to produce pulses at appropriate times without having to re-measure the trigger level.

14 Claims, 2 Drawing Sheets

ROTOR INBALANCE CORRECTION APPARATUS AND METHOD THEREOF

FIELD OF THE INVENTION

The present invention relates to an apparatus for correcting inbalances which occur in rotatable rotors. More specifically, the present invention relates to a method and apparatus which detects an inbalance in a rotor, and which allows correction of this inbalance in a new, improved and facilitated way.

BACKGROUND OF THE INVENTION

Rotors are known in the prior art for many purposes. A typical rotor is a substantially cylindrical structure intended to be rotated about a central axis perpendicular to the plane of the cylinder. Because this rotor will be rotated in use, it is crucially important that the rotor be precisely balanced so that excessive vibration does not occur during rotation.

Accordingly, many devices are known in the prior art for detecting an inbalance in a rotor and for correcting for this inbalance. A balancing machine of this type is shown, for example, in U. S. Pat. No. 3,751,987. The present invention represents an improvement over these prior art devices. The invention is usable on two plane balancing machines as well. Then of course two planes are detected in the measuring station and two planes are corrected—one plane after the other—in the correction station A known prior art device first determines the inbalance of a rotor by spinning the rotor and detecting a location of the inbalance with respect to a location defined as phase 0 (zero).

The phase 0 is established by writing a chalk line or imprinting a line or the like on the rotor. A light shines on the phase 0 mark while the rotor is rotated. A photodetector produces output signals indicative of the location of the mark as detected by reflections. After the rotor comes up to speed, a voltage from the photodetector which detects the phase 0 mark is discriminated, and the highest voltage is determined to be the phase 0 mark.

The area of the rotor other than the phase 0 mark, however, may also have reflective areas. For instance, dirt or the like which is adhered to the rotor may cause spurious reflections other than those reflection caused by the phase 0 mark. It is expected that these reflections will be less than the phase 0 mark, and accordingly the highest reflection is taken as the phase 0 mark.

After a steady-state rotation is established, a threshold level is set at 80% of the highest reflection, assumed to be the phase 0 mark. The inbalance is detected with respect to this phase 0 mark in ways which are known to those of ordinary skill in the art and will not be repeated here.

The rotor is then removed from the inbalance detecting station and placed on an inbalance correcting station. The information from the inbalance detecting station is used to correct the rotor on the inbalance correcting station. Specifically, this information will typically include distance (degrees) from phase 0; and an amount of material which needs to be removed from the rotor at that position. The operator at the correcting station then determines phase 0 either by the same technique as the phase 0 was detected in the inbalance detecting station, or by manually ascertaining the location of the phase 0 mark. After phase 0 is established, the operator determines the predetermined degrees from phase 0 and removes the predetermined amount of material.

However, such a structure has problems and drawbacks. First of all, since the inbalance correcting station must independently determine phase 0, it takes extra time to so determine. The detection of phase 0 is a relatively time-consuming process, as it requires either the detection of a steady peak voltage, or requires an operator to manually determine what is believed to be phase 0. Determining the distance from phase 0 is also a relatively slow determination.

The present invention is provided in recognition of these problems, and solves these problems in a new and unobvious way.

SUMMARY OF THE INVENTION

Specifically, the present invention recognizes that it is advantageous to provide two separate stations, one for inbalance detection and the other for inbalance correction, as did the prior art. This is advantageous, as is known in the art, because it allows higher throughput of the devices and also allows more accuracy. The inbalance detection station requires the rotor to be spun for a long period of time to reach a steady-state determination of peak reflection, and to determine precise defects in the rotor. The inbalance correction station typically performs a drilling or a milling operation, and therefore produces a large amount of vibration. This vibration would itself somewhat inbalance the rotor, and therefore would interfere with the possibility of the inbalance detection on the same machine as its detection. Moreover, if there were only a single station, each device would have to be painstakingly tested and corrected one by one.

The inventor of the present invention recognized this problem, but also recognized that the threshold voltage for the phase 0 mark for any particular rotor is known from the detection made in the inbalance detection circuit, as it must inherently be detected there. This threshold may be different for other rotors, but will always be the same for any specific rotor. Therefore, this threshold is used again, according to the present invention, and is coupled to the inbalance correction station. The rotor need make only one rotation on the inbalance correction station, since the threshold to be used has already been determined in the inbalance detection circuit. This simplifies the operation, using a better procedure than was known and used in the prior art.

The prior art structure whereby the threshold was independently determined a second time on the inbalance correction station required extra labor and was relatively inefficient. The technique whereby an operator visually determined the position of phase 0 mark was even worse. Not only was this time consuming, inefficient and labor intensive, but also it invited the possibility of errors. The inbalance detection circuit "assumes" that the highest detected voltage level is the phase 0 mark. However, if there is a highly reflective dirt spot on the rotor, it may actually be more reflective than the phase 0 mark, especially if the phase 0 mark is relatively dull. Therefore, the inbalance detection circuit may in fact determine this other spot as being phase 0, instead of the mark intended to be phase 0. The threshold detecting system keeps the relative equality as being constant, and a spot other than phase 0, is taken as phase 0 as long as it is consistent. However, an operator would have no idea that one spot on the rotor is more reflective than the phase 0 mark. Therefore, this operator would assume that the phase 0 mark was actually what the inbalance detector took as phase 0, and would therefore make the inbalance corrections relative to, and therefore at, the wrong spot.

The present invention obviates this problem by using the same threshold for both the inbalance detection circuit and the inbalance correction circuit This facilitates operation, quickens the operation, and also ensures that it is carried out more accurately.

BRIEF DESCRIPTION OF THE DRAWINGS

These and other aspects of the invention will now be described with reference to the accompanying drawings, wherein.

DESCRIPTION OF THE PRESENTLY PREFERRED EMBODIMENTS

Figure 1:
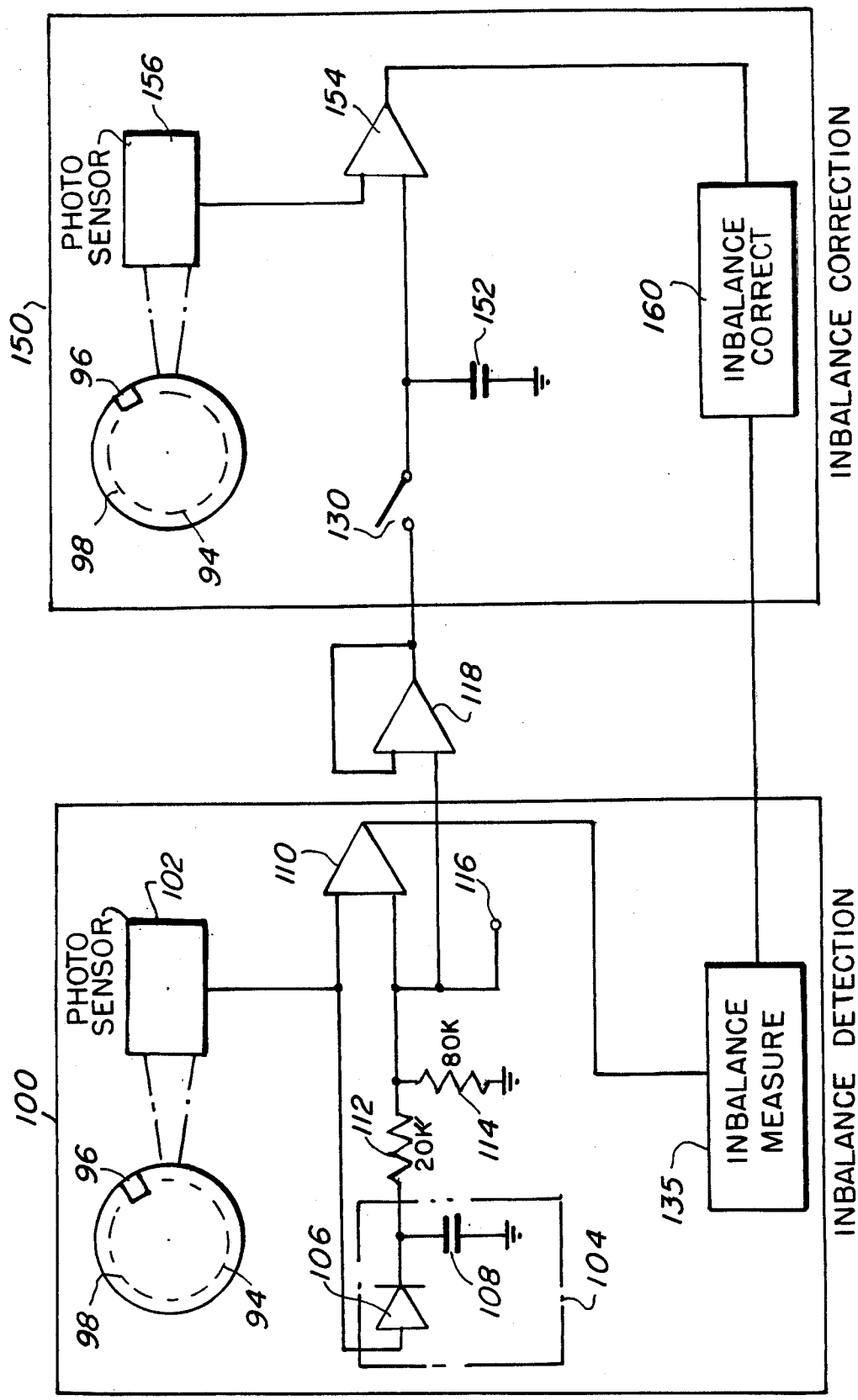
FIG. 1 shows a block diagram of the system according to the present invention.

The following exemplary embodiment illustrates the present invention. FIG. 1 shows a block diagram of a first embodiment of the present invention. This embodiment includes an inbalance detection station 100 and an inbalance correction station 150. Unbalance detection station 100 is shown with rotor 98 which is formed with a phase 0 mark 96 and a plurality of dirt marks 94. Photosensor 102 is pointed at a surface of the rotor 98 which includes the phase 0 mark 96, and has the purpose of detecting reflections from the rotor. These reflections can be reflections from either the phase 0 mark 96 or from the dirt 94. These reflections are coupled to the phase 0 detecting circuit 90.

The signals are coupled to a peak detector 104 which in this embodiment is formed by a diode 106 and capacitor 108. Capacitor 108 is charged to the highest input voltage which it receives. The signals from photosensor 102 are also coupled to comparator 110. Comparator 110 acts as the trigger for the system.

In operation, the signals from photosensor 102 charges peak detector 104 to its highest peak voltage and the peak detector stores this signal, once the capacitor 108 has had time to charge. Eventually peak detector 104 stores the maximum voltage which has been detected by photosensor 102. The output of peak detector 104 is divided by a dividing means which in this embodiment includes two resistors 112 and 114 to produce an 80% output 116. A first resistor 112 has a value of 20K and a second resistor 114 has a value of 80K. This produces an output signal divided by (80)/(80+20) or a voltage of 80% of the input signal.

At steady state, therefore, the output of the dividing means is equal to 80% of the peak voltage detected from the rotor surface.

The signal from the rotor surface detected by photosensor 102 is also coupled directly to comparator 110, to its other input. Whenever this phase 0 signal is detected, it will be higher than the 80% signal which is coupled to the other input of the comparator As such, the comparator will trigger each time the phase 0 pulse is detected at one of its inputs. The resultant output pulse 120 is used as the phase reference pulse for the measuring station and used to determine a reference point for the determination of an inbalance location. The actual inbalance determination is made by measuring circuit 135 in the conventional way.

According to this embodiment, the 80% voltage level 116 also gets connected to an impedance amplifier 118. In this embodiment, this impedance amplifier is nothing more than a follower. The output of impedance amplifier 118 is connected to transfer switch 130. Transfer switch 130 connects the 80% signal from the inbalance detection station 100 to the inbalance correction station 150. The output of transfer switch 130 is connected to a peak voltage memory 152 located in the inbalance correction station 150. This peak voltage memory 152 somewhat holds the signal which is received from the inbalance detection station 100, to use this signal as a trigger level. The trigger signal gets input to one input of comparator 154, which serves as the trigger production device for the inbalance correction station 150. The other input of comparator 154 receives a signal from the photosensor 156, which is a photosensor which monitors the rotor 98 on the inbalance correction circuit 150. Photosensor 156 is shown reading signals from rotor 98, which is the same rotor as that shown in the inbalance detection station 100. Therefore, the peak signals obtained from photosensor 156 irradiating rotor 98 Will be the same as those obtained from photosensor 102 irradiating the same rotor 98; and therefore the same threshold can be used. The rotor need not undergo the plurality of rotations necessary to achieve steady-state to get the proper reference value. While the rotor 98 must undergo a number of rotations in the inbalance detection station in order to detect the peak voltage, once this is done once it need not be repeated in the inbalance correction station. The inbalance correction unit 160 corrects the inbalance in the rotor based on the trigger from comparator 154.

Impedance amplifier 118 and/or capacitor 152 can be substituted by digital memory, voltage 116 is then digitized with an A to D converter, digital information is stored and reconverted to a DC voltage with a D-A converter.

Figure 2A:
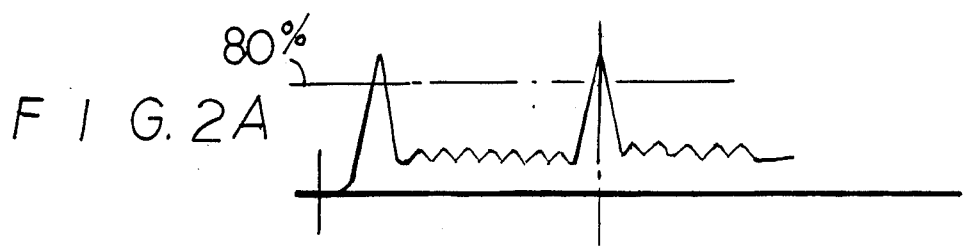
FIG. 2 (including parts 2A-2E) shows waveforms at representative points in the apparatus.
Figure 2B:
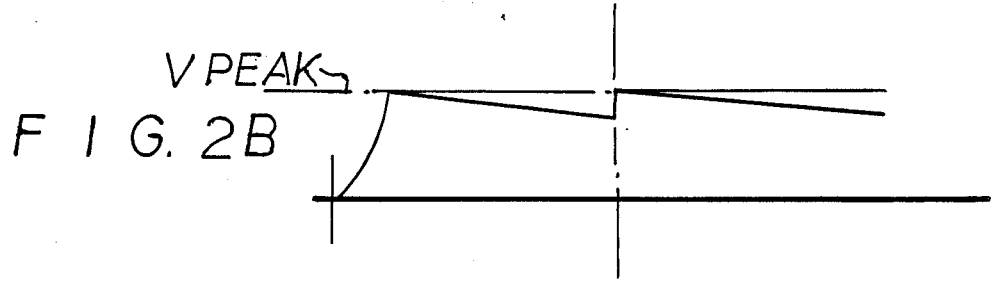
Figure 2C:
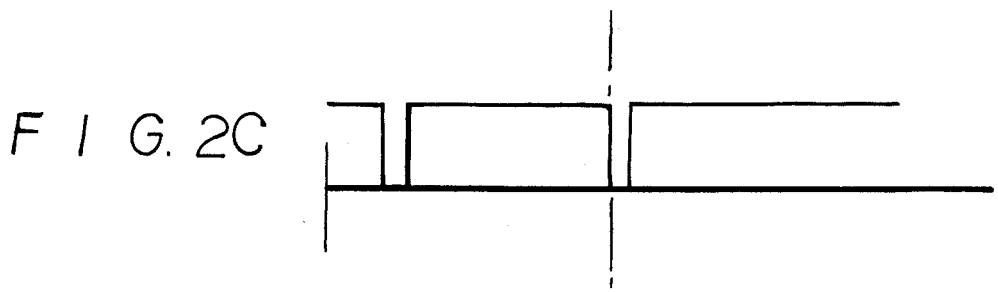

Some representative waveforms in the operation of this embodiment will now be described with reference to FIG. 2. FIG. 2A shows the output of photosensor 102 including showing the peak values from this output signal. FIG. 2B shows output 116 of peak detector 104. This signal ramps up, charging to the peak voltage each time the peak pulse passes by. FIG. 2C shows the output of comparator 120, including the trigger caused thereby.

Figure 2D:
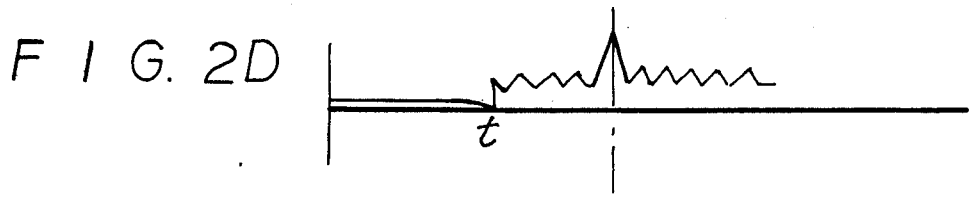
Figure 2E:
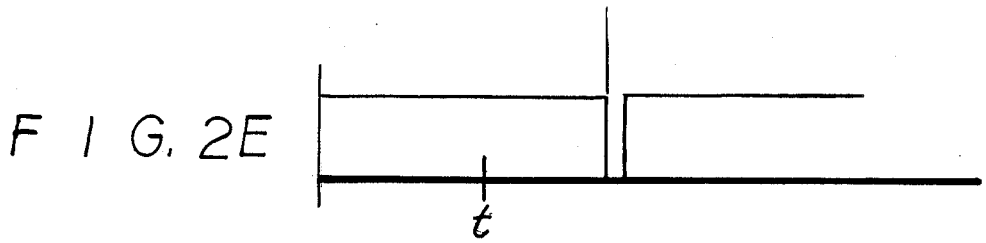

FIG. 2D shows the output of photosensor 156 in the inbalance correction station, into one input of comparator 154. The 80% voltage signal 116 from inbalance detection circuit 100 is input to the other input of comparator 154. Time t is shown, as the time when the transfer switch 130 is closed to transfer this peak voltage and the rotor 98 from station 100 to station 150. FIG. 2E shows the output signal of trigger 154. This also shows how, just like in the inbalance detection circuit 100, the triggers in the inbalance correction circuit 150 are produced at each time when the phase 0 mark is detected by the appropriate photodetector.

Of course many modifications are possible in the preferred embodiment without materially departing from the teachings thereof. For instance, although the peak detector has been described as composed of discrete components, it could just as easily be an active peak detector including an operational amplifier or any other type of peak detector Of course, peak detector 104, voltage divider 112 and 114, follower 118 and capacitor 152 can be replaced by digital means. Similarly, other circuit elements could easily be replaced with equivalent elements known in the prior art.

Accordingly, all such modifications are intended to be encompassed within the following claims.

What is claimed is:

1. A rotor inbalance detection and correction system, including a first station and a second station, comprising:
   means, adapted to be disposed adjacent a rotating rotor, for detecting reflective areas of the rotor, and producing a signal indicative thereof;
   peak detecting means, coupled to an output of said detecting means, for detecting a peak voltage of said signal;
   first means, coupled to said peak detecting means, for establishing a phase 0 at the first station using said peak voltage as a reference; and
   second means, coupled to said peak detecting means, for establishing the same phase 0 at the second station using said same peak voltage as a reference.

2. A system as in claim 1 wherein said peak detecting means is at said first station and includes means for storing said peak voltage, and further comprising a transfer switch, coupled between said first station and said second station, for receiving said peak voltage and transferring said peak voltage to said second station when said switch is closed.

3. A system as in claim 1 further comprising means for dividing said peak voltage by a predetermined amount to establish a reference voltage which is used as said reference by said first and second means.

4. A system as in claim 3 wherein said first means comprises a comparator receiving said reference voltage at one input, and receiving an output of said detecting means at another input, for changing state whenever said another input exceeds a value of said one input.

5. A system as in claim 4 wherein said second means is also a comparator.

6. A system as in claim 5 wherein said peak detecting means is at said first station and includes means for storing said peak voltage, and further comprising a transfer switch coupled between said first and second stations, said transfer switch receiving said reference voltage at one input thereof and transferring said reference voltage to said second station when said transfer switch is closed.

7. A system as in claim 6 further comprising an impedance amplifier, coupled between said dividing means and said transfer switch for buffering and maintaining an impedance of said reference voltage.

8. A system as in claim 7 wherein said peak detecting means comprises a diode and a capacitor coupled together, said capacitor charging to a voltage, and said diode preventing said capacitor from discharging.

9. A method of operating an inbalance detection and correction station, comprising the steps of:
   first placing a rotor on the inbalance detection station, and spinning said rotor;
   detecting reflections from said rotor and determining a peak among said reflections;
   using said peak to determine a phase 0 of the rotating rotor;
   determining locations of inbalance on the rotating rotor relative to said phase 0;
   second placing said same rotor on an inbalance correcting station;
   coupling said peak from said inbalance detection station into said inbalance correction station; and
   using said peak to determine a phase 0 of the rotor on said inbalance correction station.

10. A method as in claim 9 comprising the further step of correcting for inbalances of said rotor on said inbalance correction station using said locations determined in said determining step and said peak.

11. A method as in claim 10 comprising the further step of dividing said peak by a predetermined amount to produce a reference.

12. A method as in claim 11 wherein said determining a phase 0 step includes the step of comparing said reference with the reflection detected in said detecting step.

13. A method as in claim 12 comprising the further steps of: prior to said second placing step, storing said peak, and closing a transfer switch to transfer said peak voltage from said inbalance detection station to said inbalance correction station.

14. An inbalance detection and correction system, comprising:
   an inbalance measuring station comprising:
   (a) means for receiving a rotor to be tested and for rotating said rotor;
   (b) a photosensor for detecting reflections from said rotor and producing an electrical signal indicative thereof;
   (c) a peak detector for detecting peaks among said signal from said photosensor and storing said peaks;
   (d) means for dividing an output signal of said peak detector by a predetermined amount to provide a divided peak signal;
   (e) a comparator, receiving an output of said photosensor at one input and receiving said divided peak signal at another input, for producing a pulse at each occurrence of a signal higher than said divided peak signal; and
   (f) means for measuring an inbalance in said rotor as compared with a phase 0 established by said pulse; and
   an inbalance correction station comprising:
   (a) second means for receiving said rotor to be tested;
   (b) a second photosensor for detecting reflections from said rotor and producing electrical signals indicative thereof;
   (c) means for receiving said divided peak voltage from said inbalance measuring station;
   (d) a second comparator, receiving an output of said second photosensor at one input and receiving said divided peak signal at another input, for producing a second pulse when said output of said second photosensor exceeds said divided peak; and
   (e) means for correcting an inbalance in said rotor based on said measuring of said inbalance measuring station, and as measured from a phase 0 determined by said second comparator using said same divided peak voltage.

* * * * *

UNITED STATES PATENT AND TRADEMARK OFFICE
CERTIFICATE OF CORRECTION

PATENT NO. : 4,945,763

DATED : August 7, 1990

INVENTOR(S) : Richard Mueller

It is certified that error appears in the above-identified patent and that said Letters Patent is hereby corrected as shown below:

Column 3, line 37, after "circuit", delete "90".

Column 3, line 39, change "!06" to --106--.

Column 3, line 65, after "pulse", delete "120".

Column 4, line 7, change "1!8" to --118--.

Signed and Sealed this

Seventh Day of January, 1992

Attest:

HARRY F. MANBECK, JR.

*Attesting Officer*     *Commissioner of Patents and Trademarks*